United States Patent [19]
Roberson

[11] Patent Number: 6,142,349
[45] Date of Patent: Nov. 7, 2000

[54] WEAPONRY HOLDER FOR A VEHICLE

[76] Inventor: Melanie Roberson, 120 Midway Ave., Cottage Hills, Ill. 62018

[21] Appl. No.: 09/176,641

[22] Filed: Oct. 21, 1998

[51] Int. Cl.$^7$ ........................................................ B60R 9/00
[52] U.S. Cl. ........................... 224/401; 224/558; 224/565; 224/568; 224/571
[58] Field of Search ................................... 224/401, 913, 224/916, 324, 558, 565, 568, 570, 571; 211/71.01; 248/146, 154

[56] References Cited

U.S. PATENT DOCUMENTS

| | | | |
|---|---|---|---|
| 1,346,581 | 7/1920 | Yost | 224/401 |
| 2,474,513 | 6/1949 | Behrens | 224/482 |
| 2,899,162 | 8/1959 | Young | 248/154 |
| 2,969,900 | 1/1961 | Heuler | 248/154 |
| 4,150,806 | 4/1979 | Dziuk | 248/154 |
| 4,247,030 | 1/1981 | Amacker | 224/401 |
| 4,760,944 | 8/1988 | Hughes . | |
| 4,915,273 | 4/1990 | Allen . | |
| 4,957,229 | 9/1990 | Freeman . | |
| 5,249,722 | 10/1993 | Horn . | |
| 5,595,333 | 1/1997 | Boston . | |
| 5,641,106 | 6/1997 | Slaughter et al. . | |
| 5,697,181 | 12/1997 | Savant | 224/401 |
| 5,706,990 | 1/1998 | Lahrson | 224/401 |
| 5,878,929 | 3/1999 | Leonard | 224/401 |

*Primary Examiner*—Gregory M. Vidovich
*Attorney, Agent, or Firm*—Kenneth Tolar

[57] ABSTRACT

A weaponry holder for an all terrain vehicle includes a planar, rectangular attachment plate having stabilizing bars perpendicularly extending from each corner thereof. The distal ends of each stabilizing bar are outwardly flared allowing a weaponry case to be wedged therebetween. Each of two opposing edges of the attachment plate include one or more loops with a loop on a first side having a strap permanently attached thereto. The opposing end of the strap is removably attachable to the opposing loop to further secure the weaponry case between the stabilizing bars. The plate further includes a securing means for further securing the plate to a cargo rack.

4 Claims, 1 Drawing Sheet

WEAPONRY HOLDER FOR A VEHICLE

BACKGROUND OF THE INVENTION

The present invention relates to a weaponry holder which may be easily secured to the cargo rack of a vehicle.

DESCRIPTION OF THE PRIOR ART

Hunters often use a bow and arrow when hunting certain game such as deer. However, the design of the bow and arrow makes them susceptible to breakage during transport. Although protective cases for such weapons exist, they are not easily transported since all terrain vehicles (ATV's) typically have minimal storage space. The present invention provides a uniquely configured holder for attaching to a utility or all terrain vehicle cargo rack that is adapted to securely retain a weapon case thereon.

Various bow and arrow holders exist in the prior art. For example, U.S. Pat. No. 5,641,106 issued to Slaughter et al. relates to an archery bow storage rack for vehicles including first and second frame halves that are joined with a pair of tensioning adjustment straps. The frame halves are secured to the hood of a vehicle for storing a bow thereon.

U.S. Pat. No. 5,595,333 issued to Boston relates to a rack for transporting a rifle, shotgun or hunting bow on an all terrain vehicle including a clamping arrangement that engages the limbs of a hunting bow in a direction substantially normal thereto. The rack further includes support arms for holding and supporting a hunting seat. Additionally, the rack is provided with two detachable cradles which may be disposed on a portion of the clamping mechanism and clamped by the remainder of the clamping mechanism. The cradles include hook shaped support surfaces for supporting a gun in a substantially horizontal orientation.

U.S. Pat. No. 5,249,722 issued to Horn relates to a transport bracket assembly for weaponry including a first bracket affixed to a vertical panel adjacent a pick-up truck bed and a swinging bracket connected to the fixed bracket. A clip assembly is attached to the swinging bracket and engages the stabilizer of a conventional bow.

U.S. Pat. No. 4,957,229 issued to Freeman relates to a holder for permitting bow storage in the cargo box or cab of a pick-up truck. An upright main member includes upper and lower arms shaped for bow and bow string retention with the latter exerting a downward force on the bow to hold it in place. A support extends outwardly toward the truck structure for securing the main member thereto.

U.S. Pat. No. 4,915,273 issued to Allen relates to a bow and gun holder for off road vehicles. The device includes a pair of brackets which can be attached to the handlebars of an ATV or motorcycle. The brackets include spring biased, U-shaped clamps which can be positioned on a mounting bar, with the bar being secured to the handlebars.

U.S. Pat. No. 4,760,944 issued to Hughes relates to a sling assembly for a bow including a pair of mounting members adapted to be wrapped around the bow and a sling which is removably attached to the mounting members. Each of the mounting members comprises a sheet of fabric having VELCRO® fasteners thereon for securing around the bow.

Although various weapon storage devices exist in the prior art, none relate to a convenient, easy to use device according to the present invention. The present invention provides a retaining bracket that may be quickly secured to a vehicle cargo rack. The device includes a plurality of stabilizing members for tightly engaging opposing portions of a weapon case and one or more straps for further securing the case.

SUMMARY OF THE INVENTION

The present invention relates to a weapon holder for all terrain vehicles. The device comprises a planar, substantially rectangular base plate having a border strip along each peripheral edge. Perpendicularly depending from each corner of the plate is a stabilizing bar having an outwardly flared distal end. The bars are positioned and spaced such that a weaponry case may be wedged therebetween. Each of two opposing longitudinal border strips have at least one pair of apertures for receiving a U-bolt or similar attachment means to secure the plate to a vehicle's cargo rack. It is therefore an object of the present invention to provide a weaponry holder that is easy to use and inexpensive to manufacture.

It is yet another object of the present invention to provide a weaponry holder for a vehicle which may be quickly and conveniently attached to a cargo rack.

It is yet another object of the present invention to provide a weaponry holder which protects weaponry from damage during transport.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
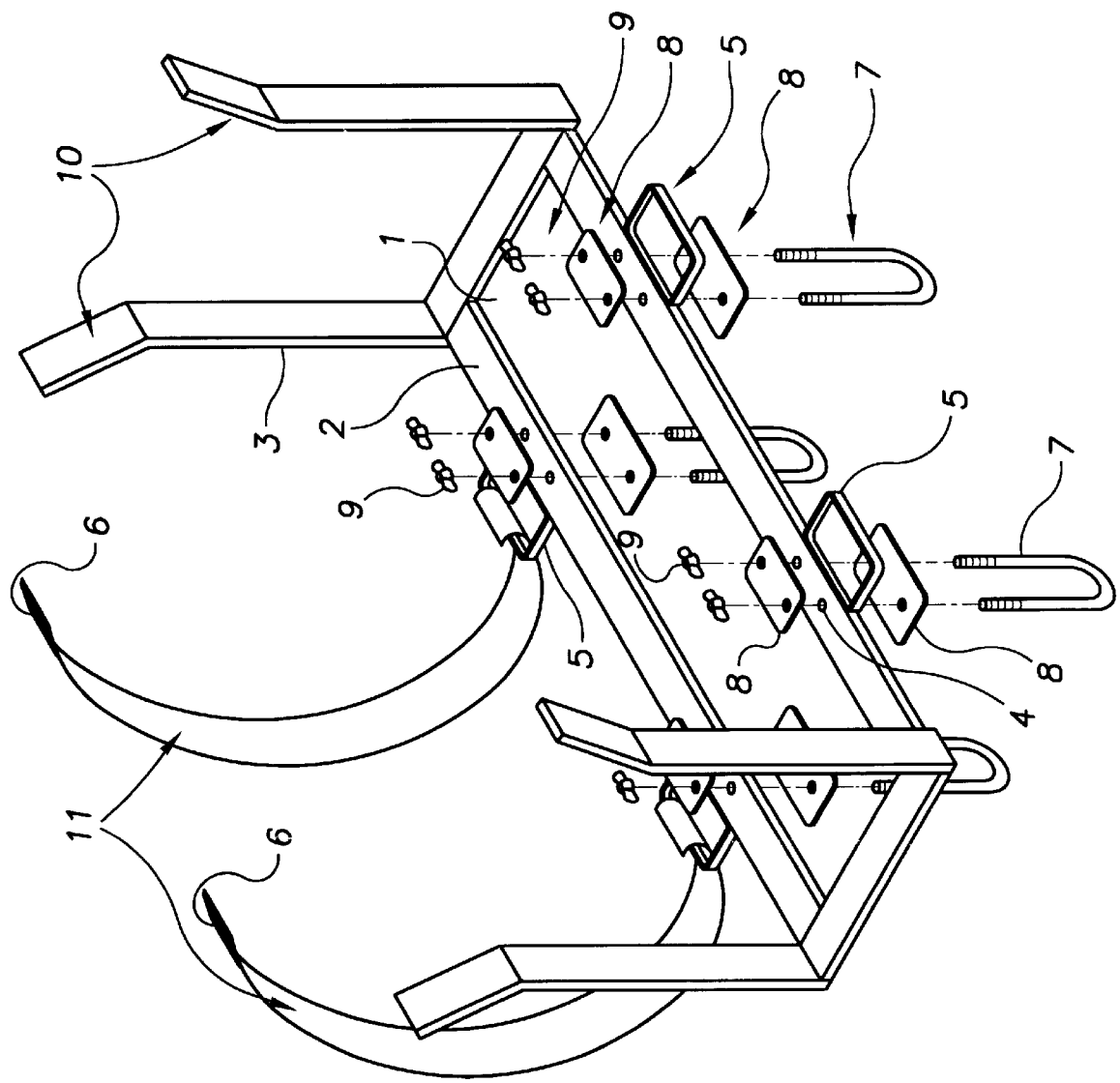
FIG. 1 is a perspective view of the inventive device.

Referring now to FIG. 1, the present invention relates to a weaponry holder that may be conveniently secured to the cargo rack of an all terrain vehicle. The device comprises a planar, substantially rectangular base plate 1 having two longitudinal and two lateral peripheral edges, an upper surface and a lower surface. On the upper surface of the plate adjacent each peripheral edge is a border strip 2. Each longitudinal border strip has one or more pairs of apertures 4 therethrough for receiving a securing assembly to secure the mounting plate to a vehicle cargo rack. Vertically depending from the upper surface of the base plate at each corner is a slightly flexible stabilizing bar 3 each having an outwardly flared distal end 10. The stabilizing bars are spaced to receive and tightly engage the exterior of a weapon case placed therebetween.

Extending from each longitudinal edge of the base plate is one or more loops 5. A first end of a strap 11 is permanently attached to a first loop. The opposing end of the strap has an attachment means 6 thereon, such as a hook-and-loop fastener, for removably securing the strap to the corresponding loop on the opposing edge. Accordingly, a weaponry case such as that used to transport a bow and arrow may be pressed between the vertical stabilizing bars. The strap is wrapped about the case and is secured to the opposing loop to further retain the case between the stabilizing bars.

The securing means relates to a U-shaped bolt 7 for surrounding a horizontal member on a vehicle cargo rack. A pair of rubber pads 8 each having a pair of apertures thereon are each placed on opposing sides of the plate with their apertures aligned with the apertures on the border strip. The terminal ends of the U-shaped bolt are inserted through the aligned apertures. A wing nut 9 or similar fastener means is threadedly secured to the terminal ends of the U-shaped bolt to tighten the plate against the cargo rack. The rubber pads on the opposing sides of the plate minimize damage to the cargo rack while providing shock absorbing qualities to the weaponry holder.

The strap according to the present invention is preferably manufactured with nylon while the attachment plate is manufactured with aluminum. However, as will be readily apparent to those skilled in the art, the size, shape and materials of construction may be varied without departing from the spirit of the present invention.

The above described device is not limited to the exact details of construction enumerated above. Various other conventional attachment means may be used to secure the plate to a cargo rack as well as to secure the strap to the loop.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A weaponry holder for a vehicle comprising:

a base plate having an upper surface, a lower surface, two longitudinal and two lateral peripheral edges, each longitudinal edge having a loop thereon and a pair of apertures adjacent thereto;

a plurality of stabilizing bars extending upwardly from said plate adapted for surrounding and engaging a weaponry protective case, said retaining bars each having an outwardly flared upper end;

a strap having two opposing ends with a first end permanently attached to one of said loops with the opposing end removably attached to the other of said loops whereby said strap is wrappable about said weaponry case and secured to the other of said loops for tightly retaining said weaponry case against said plate;

a flexible pad on the upper surface of said plate having a pair of apertures therethrough in alignment with the apertures on said plate;

a second flexible pad on the lower surface of said plate having a pair of apertures therethrough in alignment with said plate apertures;

a substantially U-shaped bolt for surrounding a portion of a cargo rack, said bolt having a pair of terminal ends received within said aligned apertures;

a fastener means removably attached to each terminal end of said U-shaped bolt to secure said holder to a vehicle cargo rack.

2. A device according to claim 1 wherein the opposing end of said strap is attached to the other of said loop with a hook and loop fastener.

3. A device according to claim 1 wherein said fastener means is a wing nut.

4. A device according to claim 1 further comprising a border strip adjacent each peripheral edge of said plate for providing structural integrity thereto.

\* \* \* \* \*